(12) United States Patent
Chinomi et al.

(10) Patent No.: US 12,122,276 B2
(45) Date of Patent: Oct. 22, 2024

(54) SKIN LOCKING CLIP

(71) Applicants: NIFCO INC., Yokosuka (JP); TS TECH CO., LTD., Asaka (JP)

(72) Inventors: Yuhei Chinomi, Kanagawa (JP); Kazuya Aoki, Tochigi (JP); Kenta Kikuchi, Tochigi (JP); Kei Okuma, Tochigi (JP)

(73) Assignees: NIFCO INC., Kanagawa (JP); TS TECH CO., LTD., Saitama (JP)

( * ) Notice: Subject to any disclaimer, the term of this patent is extended or adjusted under 35 U.S.C. 154(b) by 125 days.

(21) Appl. No.: 17/909,205

(22) PCT Filed: Mar. 4, 2021

(86) PCT No.: PCT/JP2021/008446
§ 371 (c)(1),
(2) Date: Sep. 2, 2022

(87) PCT Pub. No.: WO2021/177405
PCT Pub. Date: Sep. 10, 2021

(65) Prior Publication Data
US 2023/0085792 A1 Mar. 23, 2023

(30) Foreign Application Priority Data

Mar. 6, 2020 (JP) .................................. 2020-038508
Mar. 6, 2020 (JP) .................................. 2020-038510

(51) Int. Cl.
*B60N 2/58* (2006.01)
*A47C 7/74* (2006.01)
(Continued)

(52) U.S. Cl.
CPC ............ *B60N 2/5825* (2013.01); *A47C 7/744* (2013.01); *B60N 2/5621* (2013.01); *B60N 2/6027* (2013.01)

(58) Field of Classification Search
CPC .......................... B60N 2/5825; B60N 2/6027
See application file for complete search history.

(56) References Cited

U.S. PATENT DOCUMENTS 11,679,704 B1 * 6/2023 Gillan ...................... B60N 2/72
297/452.38
2005/0006944 A1 * 1/2005 Ali ....................... B60N 2/5825
297/452.6
(Continued)

FOREIGN PATENT DOCUMENTS

DE        102007059660 A1 *  6/2009  ........... B60N 2/5825
EP            3072736 A1 *  9/2016  ............. A47C 31/00
(Continued)

OTHER PUBLICATIONS

PCT International Search Report for Patent Application PCT/JP2021/008446 mailed May 18, 2021; 3 pp.

*Primary Examiner* — Timothy J Brindley
(74) *Attorney, Agent, or Firm* — Armstrong Teasdale LLP

(57) ABSTRACT

A skin locking clip that is firmly supported by a pad is provided. The skin locking clip (10) is disposed in a groove (8) of a pad (5) of a vehicle seat or the like, and fixes a locked portion (6c) attached to a skin material. The skin locking clip (10) includes a base plate (11), a locking piece (12) erected on the base plate (11) to lock the locked portion (6c), and an overhanging piece (13) erected on the base plate. Since the overhanging piece (13) is supported by the pad (5), the skin locking clip (10) is firmly supported by the pad (5).

4 Claims, 12 Drawing Sheets

(51) Int. Cl.
*B60N 2/56* (2006.01)
*B60N 2/60* (2006.01)

(56) References Cited

U.S. PATENT DOCUMENTS

| | | | | |
|---|---|---|---|---|
| 2007/0011853 A1* | 1/2007 | Smith | ................. | B60N 2/5825 |
| | | | | 24/545 |
| 2009/0165263 A1 | 7/2009 | Smith | | |
| 2012/0174352 A1 | 7/2012 | Tsunoda | | |
| 2016/0280106 A1 | 9/2016 | Sato et al. | | |
| 2021/0053472 A1* | 2/2021 | Eldridge | ............. | A47C 31/023 |

FOREIGN PATENT DOCUMENTS

| | | | | | |
|---|---|---|---|---|---|
| JP | 2011010727 | A | 1/2011 | | |
| JP | 2011069417 | A | 4/2011 | | |
| JP | 2015123329 | A | 7/2015 | | |
| JP | 6228562 | B2 | 11/2017 | | |
| JP | 2017205619 | A | 11/2017 | | |
| JP | 6339802 | B2 | 6/2018 | | |
| JP | 2019014217 | A | 1/2019 | | |
| WO | WO-2008017360 | A1 * | 2/2008 | ........... | B60N 2/5825 |
| WO | 2019122599 | A1 | 6/2019 | | |

\* cited by examiner

SKIN LOCKING CLIP

CROSS-REFERENCE TO RELATED APPLICATIONS

This application is a U.S. National Phase Application of PCT/JP2021/008446 filed Mar. 4, 2021, which claims the benefit of Japanese Patent Applications 2020-038508 filed Mar. 6, 2020 and 2020-038510 filed Mar. 6, 2020. The content of these applications is hereby expressly incorporated by reference in its entirety.

TECHNICAL FIELD

The present disclosure relates to a skin locking clip embedded in a groove of a pad for fixing a locked portion of a skin material that covers at least a portion of the pad, the groove extending in a prescribed direction with a prescribed width and depth.

BACKGROUND ART

In some cases, seating surfaces of a seat cushion and a seat back of a vehicle seat are provided with linear recesses so as to maintain an appearance shape thereof (see FIG. 1). A skin material is tucked in the linear recesses and fixed to a pad by skin locking clips. For example, Patent Documents 1 and 2 each disclose a skin locking clip including a base plate embedded in a pad and a pair of locking portions erected on the base plate to lock the skin material.

PRIOR ART DOCUMENT(S)

Patent Document(s)

Patent Document 1: Japanese Patent No. 6228562
Patent Document 2: Japanese Patent No. 6339802

SUMMARY OF THE INVENTION

Task to be Accomplished by the Invention

Depending on the layouts of parts that compose a seat, the size of a skin locking clip needs to be reduced, in particular, the width of a base plate needs to be narrowed. Even in such a case, it is desirable that a pad firmly support the skin locking clip. An object of the present invention is to provide a skin locking clip that is firmly supported by a pad even when the base plate is small.

Means to Accomplish the Task

One aspect of the present invention provides a skin locking clip (10, 30, 50) embedded in a groove (8) of a pad (5) for fixing a locked portion (6c) of a skin material (6) that covers at least a portion of the pad (5), the groove (8) extending in a prescribed direction with a prescribed width and depth, the skin locking clip (10) comprising: a base plate (11, 31, 51) extending along the prescribed direction and a width direction of the groove (8) and embedded in the pad (5) at least at an end in the width direction; a pair of locking pieces (12, 32, 52) erected on the base plate (11, 31, 51) so as to be opposed to each other in the width direction for locking the locked portion (6c) and each including a locking claw (18, 34, 54) on a side where the locking pieces (12) are opposed to each other; and an overhanging piece (13, 33) including an overhanging portion (21, 40) opposed to the base plate (11) on an outside of at least one of the locking pieces (12, 32, 52) in the width direction or extending more outward than an edge of the base plate (31, 51) in the width direction.

According to this aspect, not only both ends of the base plate in the width direction but also the overhanging portion are embedded in the pad, so that the skin locking clip can be firmly supported by the pad even when the base plate is small.

In the above aspect, preferably, the overhanging piece (13, 33) includes an erected portion (20, 39) erected on the base plate (11, 31), and the overhanging portion (21, 40) extends outward in the width direction of the base plate (11, 31, 51) from a tip side of the erected portion (20, 39).

According to this aspect, it is possible to easily form the pad such that the pad does not enter a space between the pair of locking pieces and the pad is filled in a portion surrounded by the base plate, the erected portion, and the overhanging portion.

In the above aspect, preferably, the erected portion (20, 39) includes at least one pair of pillars (20a, 39a) extending from the base plate (11, 31) at an interval in the prescribed direction, and an opening (23, 41) is formed between the pillars (20a, 39a).

According to this aspect, the pad enters the opening, so that the skin locking clip can be firmly supported by the pad.

In the above aspect, preferably, the overhanging piece (13, 33) further includes a connection body (22, 39b) connecting an intermediate portion of the overhanging portion (21, 40) in the prescribed direction and the base plate (11, 31).

According to this aspect, the overhanging portion is reinforced by the connection body, which is embedded in the pad, so that the skin locking clip can be firmly supported by the pad.

In the above aspect, preferably, the overhanging portion (21) opposes the base plate (11) and has an opposed surface parallel to an opposed surface provided at an end of the base plate (11) in the width direction.

According to this aspect, the pad enters a space between the overhanging portion and the end of the base plate in the width direction, so that the skin locking clip can be firmly supported by the pad. Further, the opposed surfaces provided at the overhanging portion and the end of the base plate in the width direction are parallel to each other. Accordingly, a mold for forming the skin locking clip can be easily removed therefrom and complexity of the mold can be suppressed.

In the above aspect, preferably, a stepped portion (16) is provided at the end of the base plate (11) in the width direction, the stepped portion (16) being offset from a portion adjacent thereto in a depth direction of the groove (8).

According to this aspect, the pad enters the stepped portion, so that the skin locking clip can be firmly supported by the pad. Further, the shape for forming a step of the stepped portion improves the rigidity of the skin locking clip.

In the above first aspect, preferably, each locking piece (32) further includes a wall body (17) erected on the base plate (31) and having a tip portion from which a locking claw (34) extends, the locking claw (34) includes, as viewed in a direction perpendicular to the base plate, a first side edge (35) extending from the wall body (17) toward an inside in the width direction (31), a second side edge (36) extending from the wall body (17) in a manner inclined toward the first side edge (35) with respect to the inside in the width direction, an extension end edge (37) extending from an extension end of the first side edge (35) substantially in parallel with the prescribed direction, and a beveled corner edge (38) connected to the second side edge (36) and the extension end edge (37) and having an angle relative to the prescribed direction smaller than that of the second side edge (36), and the second side edges (36) of the pair of locking claws (34) oppose each other.

According to this aspect, as a result of provision of the beveled corner edge, an angle formed by intersection of the extension line of the second side edge and the extension line of the extension end edge is eliminated, and thus, it becomes easy to insert the locked portion of the skin material between the pair of locking claws.

Further, in a conventional skin locking clip, there is play in a linear recess in a depth direction thereof in a state where a locked portion of a skin material engages with a locking portion of the skin locking clip, and thus the locked portion may swing in the skin locking clip. If design is changed to eliminate such play, it may be difficult for a worker to push in the locked portion. In view of the above background, an object of the present invention is to provide a skin locking clip that can facilitate an attachment of a locked portion of a skin material to a skin locking clip and can prevent the locked portion of the skin material from disengaging from the skin locking clip.

One aspect of the present invention provides a skin locking clip (10) embedded in a groove (8) of a pad (5) for fixing a locked portion (6c) of a skin material (6) that covers at least a portion of the pad (5), the groove (8) extending in a prescribed direction with a prescribed width and depth, the skin locking clip (10) comprising: a base plate (11) extending along the prescribed direction and a width direction of the groove (8) and embedded in the pad (5) at least at an end in the width direction; a pair of locking pieces (12) including a pair of wall bodies (17) erected on the base plate (11) so as to be opposed to each other in the width direction for locking the locked portion (6c) and a pair of locking claws (18) provided at tip portions of the wall bodies (17), wherein a biasing portion (14) is provided between the wall bodies (17) in the width direction, the biasing portion (14) biasing the locked portion (6c) locked by the locking pieces (12) in a direction away from the base plate (11).

According to this aspect, when the locked portion is pushed in, the biasing portion is deformed, so that the locked portion can be easily attached to the skin locking clip. Further, in a state where the skin locking clip locks the locked portion, the locked portion is held between the locking claws and the biasing portion. Accordingly, the locked portion does not swing in the skin locking clip, and is unlikely to disengage from the skin locking clip.

In the above aspect, preferably, the pair of locking claws (18) are offset from each other in the prescribed direction, and a distance in the width direction between the locking claw (18) of one of the locking pieces (12) and the wall body (17) of another of the locking pieces (12) is smaller than a width of the locked portion (6c), and the locking pieces (12) are elastically deformable such that the distance becomes equal to or more than the width of the locked portion (6c).

According to this aspect, in a state where the skin locking clip locks the locked portion, the locking pieces can lock the locked portion. Further, the locking claws are offset from each other in the prescribed direction, so that a worker can easily make a distance between upper ends of the pair of locking pieces larger than the width of the locked portion by rotating the locked portion, thereby disengaging the locked portion from the skin locking clip.

In the above aspect, preferably, the skin locking clip (10) is made of resin, and the biasing portion (14) includes a pair of leaf springs supported by the base plate (11) in a cantilevered manner.

According to this aspect, the biasing portion can be formed integrally with the base plate.

In the above aspect, preferably, the pair of leaf springs are provided outside the locking claws (18) in the prescribed direction and offset from each other in the width direction.

According to this aspect, the direction in which a mold is removed can be secured when the skin locking clip is formed, and the complexity of the mold can be suppressed.

In the above aspect, preferably, each of the locking pieces (12) includes a guide portion (19) extending outside in the width direction from the tip portion of the wall body (17), and upper surfaces of the locking claw (18) and the guide portion (19) in the depth direction are smoothly continuous with each other and inclined downward toward an inside in the width direction.

According to this aspect, when the locked portion is pressed on upper portions of the locking pieces so that the locked portion is locked by the skin locking clip, the guide portion guides the locked portion to a space between the pair of locking pieces and the locked portion can be inserted between the upper portions of the pair of locking pieces even if the position of the locked portion is offset in the width direction.

Effect of the Invention

According to the present invention, a skin locking clip firmly supported by the pad can be provided.

DETAILED DESCRIPTION OF THE INVENTION

In the following, an embodiment of the present invention will be described with reference to the drawings.

Figure 1:
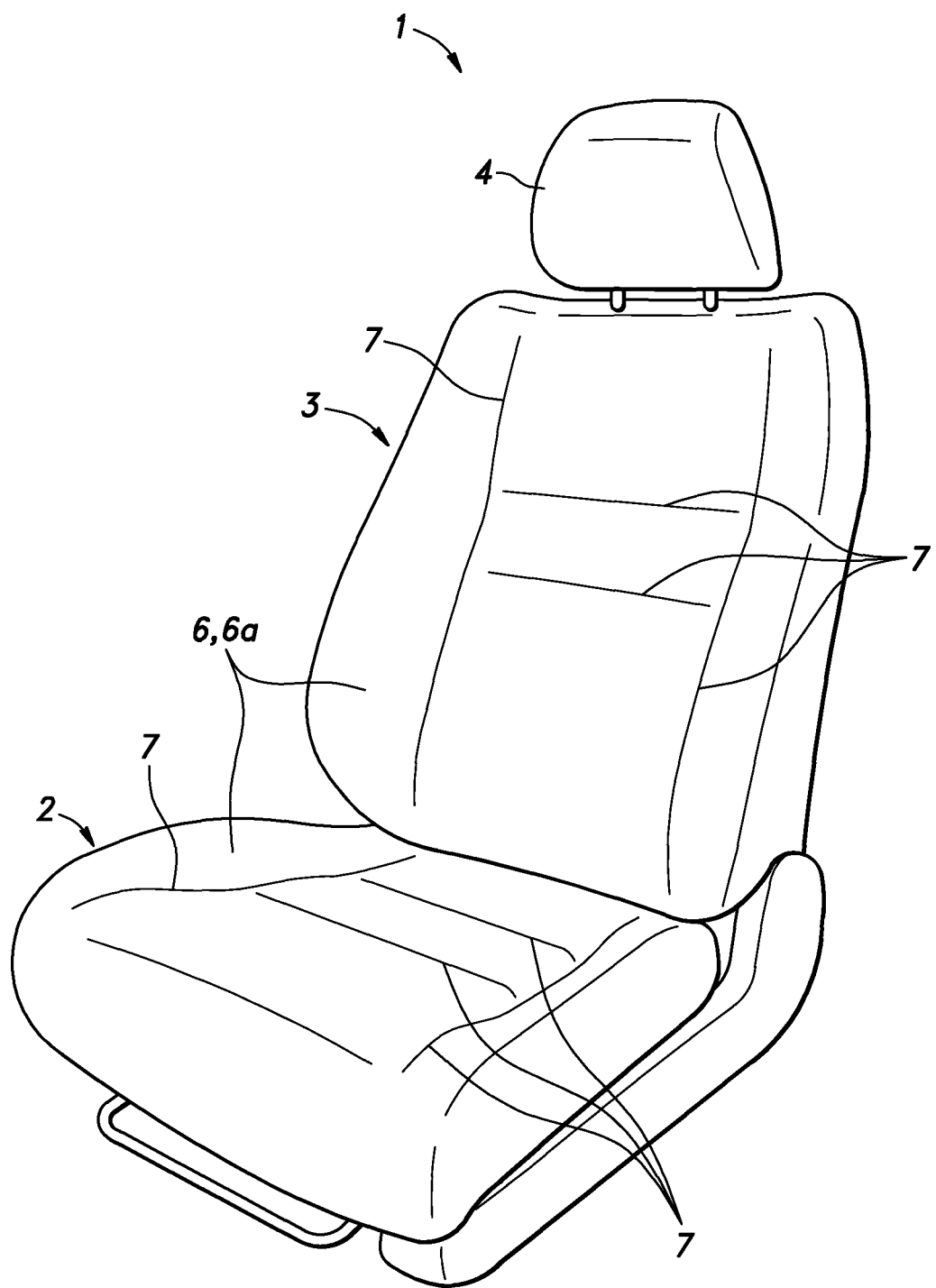
FIG. 1 is a perspective view of a vehicle seat to which a skin locking clip according to a first embodiment is applied.

FIG. 1 is a perspective view of a vehicle seat 1 according to the embodiment of the present invention. The vehicle seat 1 includes a seat cushion 2 supported by a vehicle body, a seat back 3 coupled to the seat cushion 2, and a headrest 4 coupled to the seat back 3. Each of the seat cushion 2, the seat back 3, and the headrest 4 includes a pad 5 (see FIG. 2) made of foaming resin such as urethane foam, and a skin material 6 covering a seating surface side of the pad 5. On surfaces of the seat cushion 2 and the seat back 3 on the seating surface side, a plurality of tuck-in portions 7, which are linearly recessed as the skin material 6 is tucked in the pad 5, are formed in the up-and-down direction and the horizontal direction.

Figure 2:
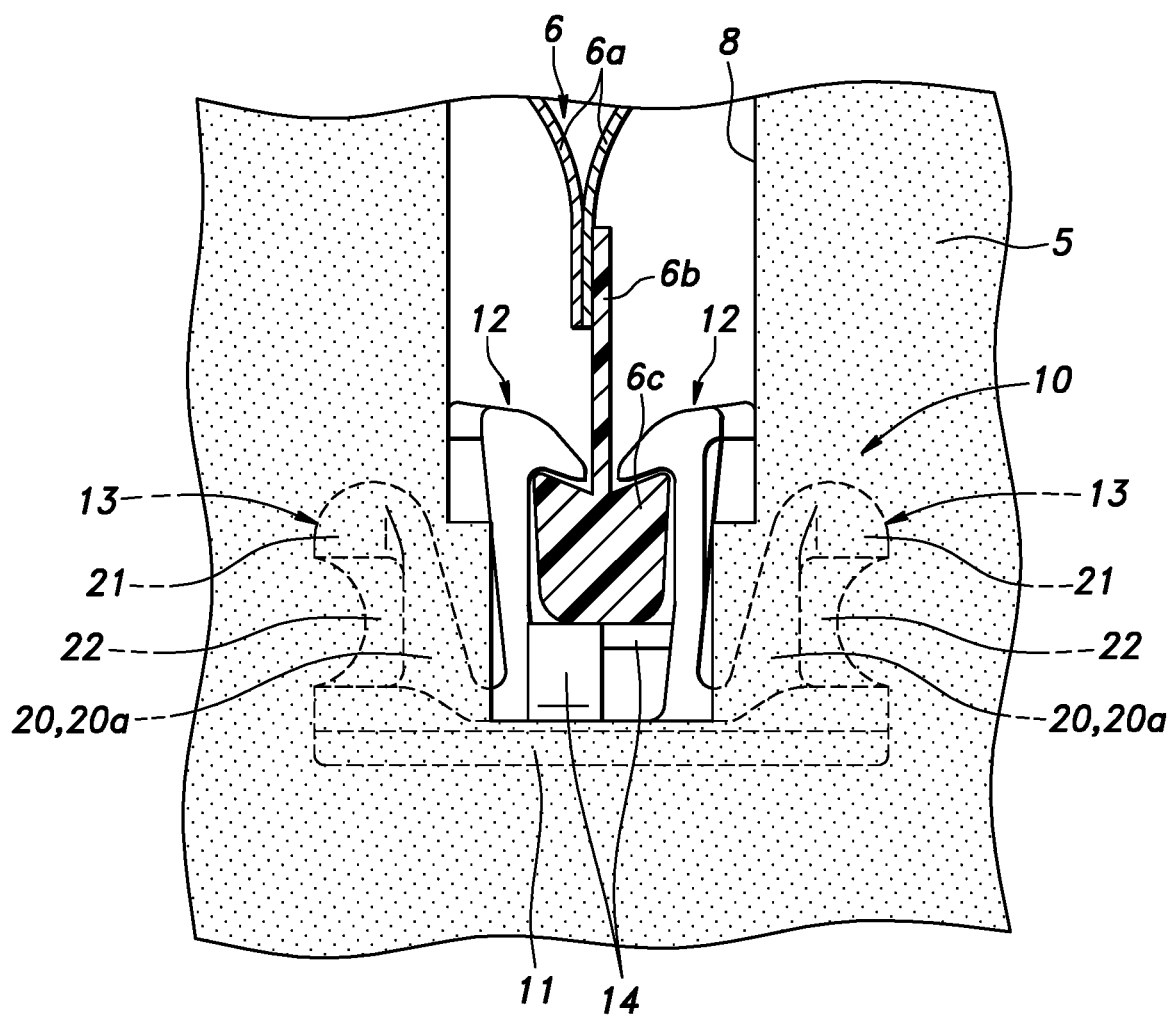
FIG. 2 is a front cross-sectional view showing a state where the skin locking clip according to the first embodiment is attached to a pad.
Figure 3:
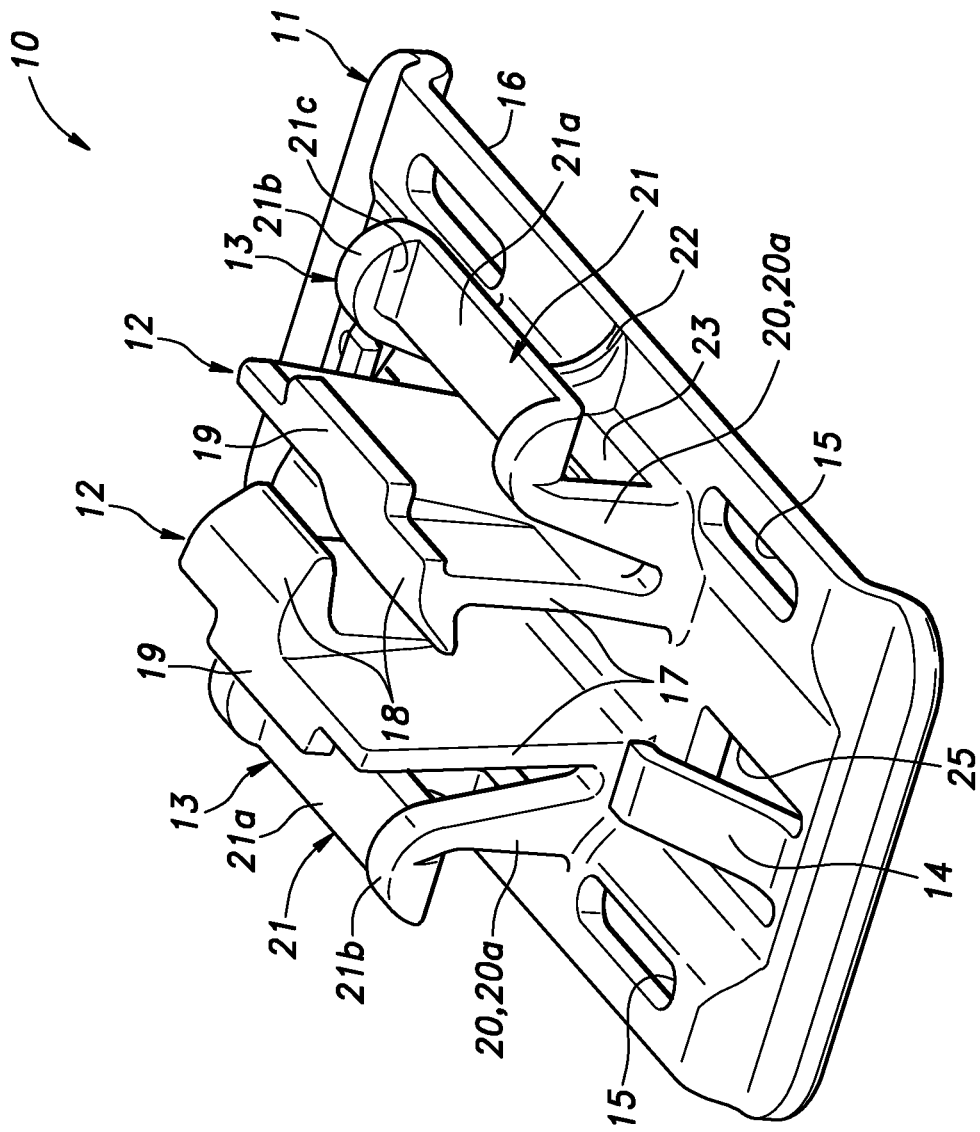
FIG. 3 is a perspective view of the skin locking clip according to the first embodiment.
Figure 4:
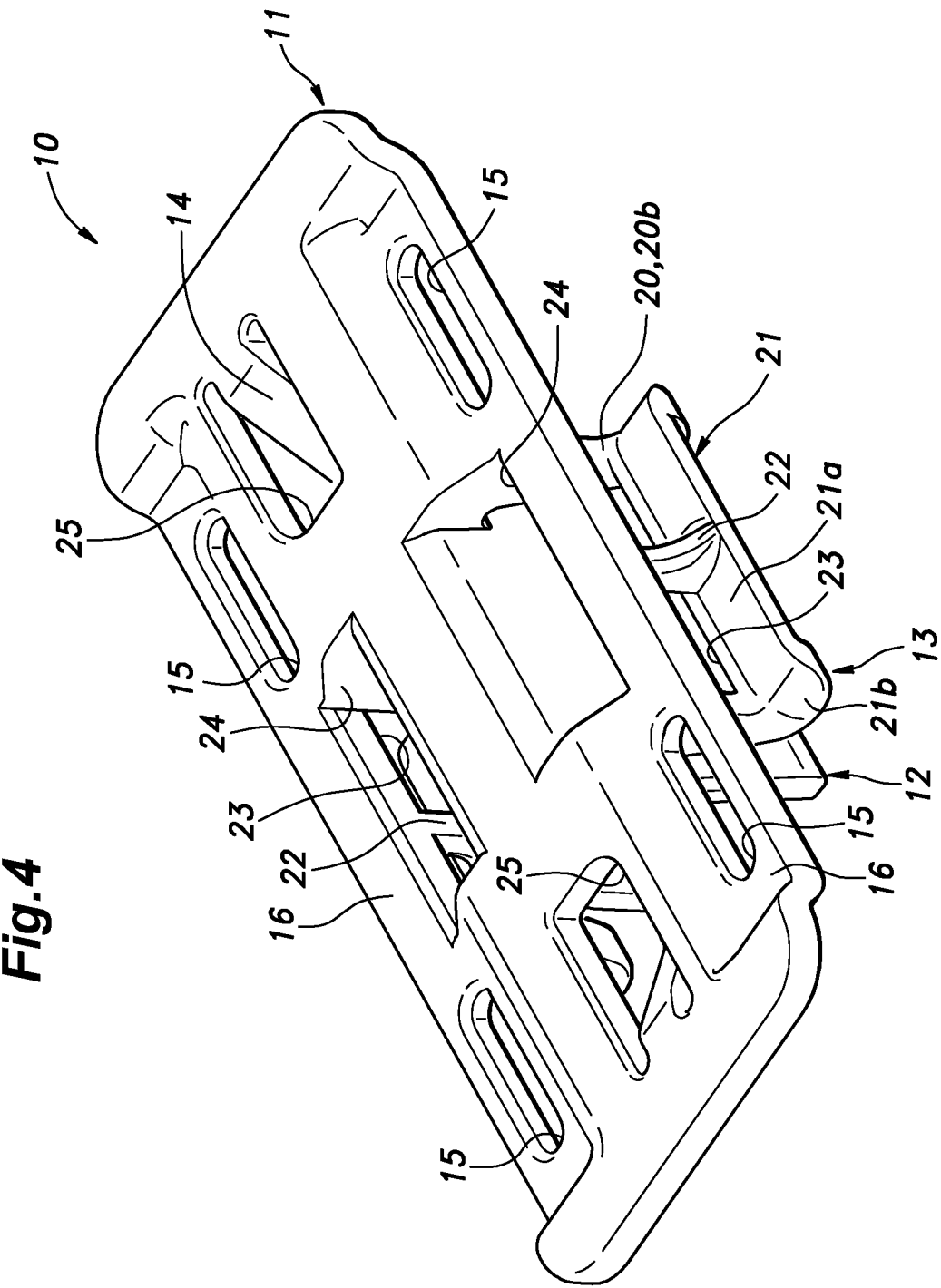
FIG. 4 is a perspective view of the skin locking clip according to the first embodiment.
Figure 5:
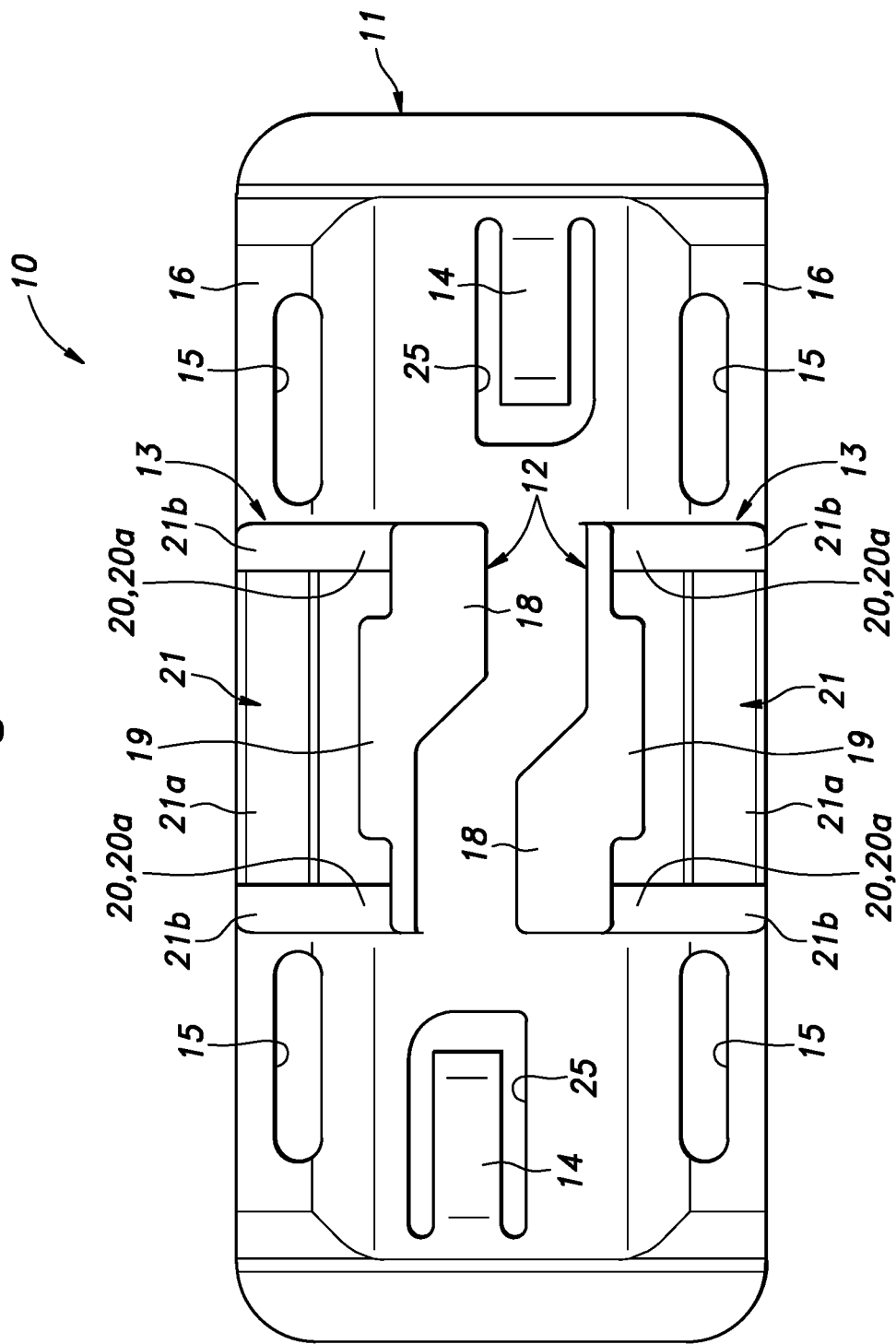
FIG. 5 is a plan view of the skin locking clip according to the first embodiment.
Figure 6:
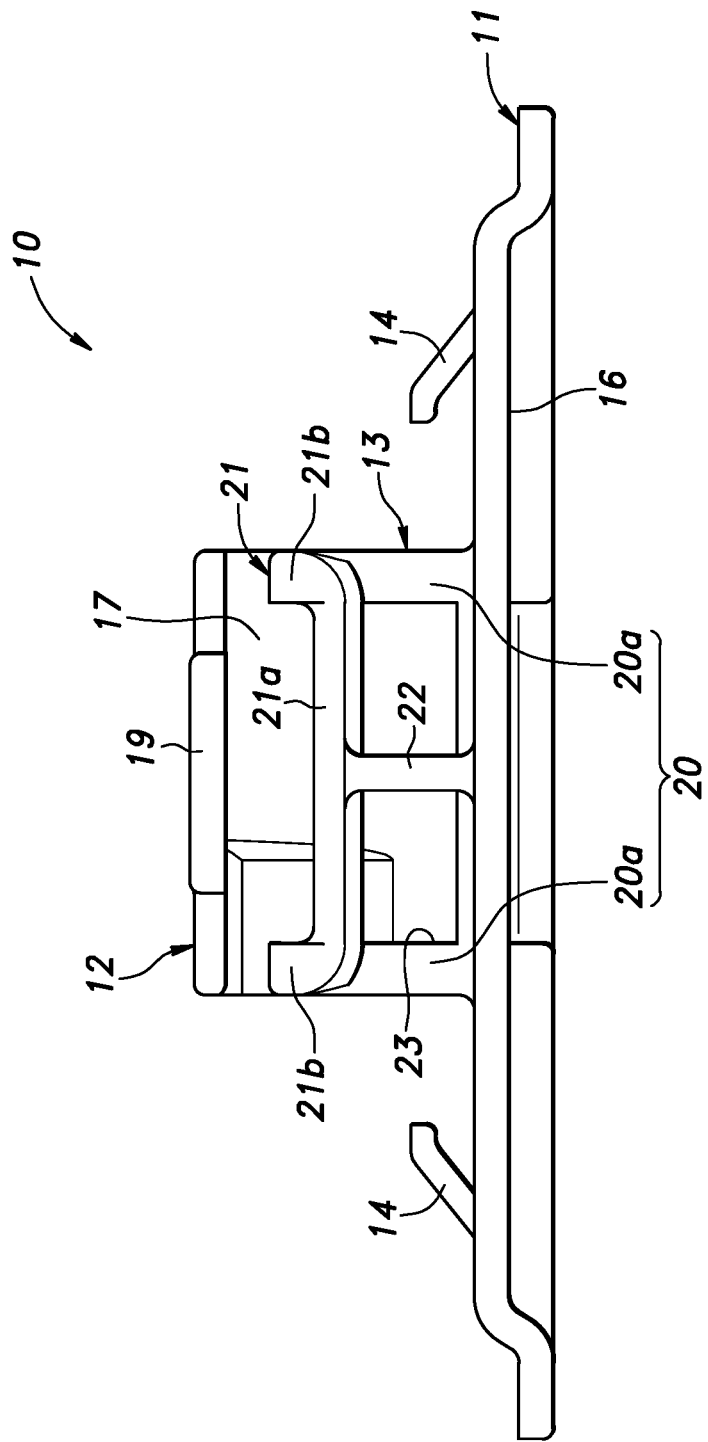
FIG. 6 is a side view of the skin locking clip according to the first embodiment.

FIG. 2 shows a state where a skin locking clip 10 (hereinafter referred to as "the clip 10") according to the embodiment is embedded in the pad 5. A groove 8 is provided at a portion of the pad 5 corresponding to each tuck-in portion 7. The groove 8 extends in a prescribed direction with a prescribed width and depth, and opens on an opposite side of the bottom thereof in the depth direction. In the following, unless otherwise noted, the direction of "upper" and "lower" does not refer to an upper side and a lower side of a vehicle, but refers to an opening side and a bottom side of the groove 8 in the depth direction. The skin material 6 (see FIG. 1) includes a main body portion 6a covering the pad 5, a cloth-like skin connecting portion 6b connected to the main body portion 6a at an upper end thereof and extending along the extending direction of the groove 8, and a locked portion 6c connected to a lower end of the skin connecting portion 6b and extending along the extending direction of the groove 8. The locked portion 6c is a rod-shaped or string-shaped member that bulges from the skin connecting portion 6b in the width direction of the groove 8, and is locked by the clip 10. The locked portion 6c has a substantially rectangular shape in a cross-section perpendicular to an extending direction thereof. An upper side of the locked portion 6c is recessed in a V shape, and a pair of side pieces of the locked portion 6c are slightly inclined so as to approach each other toward a lower side. In a cross-sectional view, the locked portion 6c is connected to the skin connecting portion 6b at the center of the V-shaped upper side of the locked portion 6c. The skin connecting portion 6b and the locked portion 6c are made of resin, and are integrally formed by extrusion molding.

FIGS. 3 to 6 show the clip 10. As shown in FIGS. 2 to 6, the clip 10 includes a base plate 11 embedded in the pad 5 at both ends in the width direction thereof, a pair of locking pieces 12 erected on an upper surface of the base plate 11 and configured to lock the locked portion 6c, a pair of overhanging pieces 13 erected on the upper surface of the base plate 11 outside the pair of locking pieces 12 in the width direction, and a pair of biasing portions 14 supported by the base plate 11 and configured to bias the locked portion 6c upward. The clip 10 has a symmetric shape (double symmetric shape), and the shape of the clip 10 before rotation coincides with the shape of the clip 10 after rotation when the clip 10 rotates 180° (360°/2) around an up-and-down axis passing through the center in the extending direction thereof and the center in the width direction thereof. Preferably, the clip 10 is an injection-molded product made of resin.

The base plate 11 is a plate-shaped portion, and the longitudinal direction and the width direction thereof coincide with the extending direction and the width direction of the groove 8, respectively. In the following, unless otherwise noted, "the prescribed direction" refers to the direction that coincides with the extending direction of the groove 8 and the longitudinal direction of the base plate 11, and "the width direction" refers to the direction that coincides with the width directions of the groove 8 and the base plate 11. At both ends of the base plate 11 in the width direction, a plurality of through holes 15 penetrating therethrough in the up-and-down direction are provided. Further, at each of both ends of the base plate 11 in the width direction, a stepped portion 16, which is recessed so as to be translated parallel to an upper side, is formed.

The pair of locking pieces 12 are configured so as to be arranged in the groove 8. Each of the pair of locking pieces 12 includes a wall body 17 erected on the base plate 11, a locking claw 18 extending from a tip portion of the wall body 17 toward an inside in the width direction so as to lock the locked portion 6c, and a guide portion 19 extending from the tip portion of the wall body 17 toward an outside in the width direction.

The wall body 17 is a plate-shaped portion arranged substantially perpendicularly to the width direction. The wall body 17 is arranged at the center in the prescribed direction, and the length of the wall body 17 in the prescribed direction is preferably about ¼ to ½, more preferably about ⅓ of the length of the base plate 11 in the prescribed direction.

The locking claw 18 inclines downward toward the inside in the width direction, and the thickness thereof in the up-and-down direction becomes thinner toward the inside in the width direction. Since each of the pair of locking pieces 12 is provided with the locking claw 18, a pair of locking claws 18 are provided in total. The pair of locking claws 18 are arranged at positions offset from each other in the prescribed direction. Each locking claw 18 preferably extends from the center of the wall body 17 in the prescribed direction toward one end of the wall body 17 in the prescribed direction. In a plan view, a side edge of each locking claw 18 on a center side in the prescribed direction is preferably notched so as to incline such that the shortest distance between the pair of locking claw 18 is extended, and the inclination angle thereof with respect to the width direction is preferably 45°. The distance in the width direction between the locking claw 18 of one of the pair of locking pieces 12 and the wall body 17 of the other of the pair of locking pieces 12 is smaller than the width of the locked portion 6c, but the pair of locking pieces 12 are elastically deformable such that the above distance becomes equal to or more than the width of the locked portion 6c. The shortest distance between the pair of locking claws 18, which are offset from each other in the prescribed direction, is similar to the above distance, or equal to or greater than the width of the locked portion 6c before elastic deformation thereof. The distance from each locking claw 18 to the base plate 11 in the up-and-down direction is greater than the height of the locked portion 6c in the up-and-down direction, and preferably at least 1.5 times the height thereof or more.

The guide portion 19 inclines upward toward an outside in the width direction. For each of the pair of locking pieces 12, at least a portion of the guide portion 19 matches at least a portion of the locking claw 18 in the width direction, and an upper surface of the guide portion 19 and an upper surface of the locking claw 18 are smoothly continuous with each other. The guide portion 19 is arranged in the center of the wall body 17 in the prescribed direction, and the length thereof is preferably equal to or more than ¼ of, and more preferably about ½ of the length of the wall body 17 in the prescribed direction. Alternatively, the length of the guide portion 19 may coincide with the length of the wall body 17.

The pair of overhanging pieces 13 are arranged so as to be embedded in the pad 5. The pair of overhanging pieces 13 are mirror images of each other and symmetrical with respect to a plane passing through the center of the clip 10 in the width direction and arranged perpendicularly to the width direction. Each of the pair of overhanging pieces 13 includes an erected portion 20 erected on the upper surface of the base plate 11, an overhanging portion 21 extending outward in the width direction from a tip side of the erected portion 20 and opposed to an upper surface of the end portion of the base plate 11 in the width direction, and a connection body 22 connecting an intermediate portion of the overhanging portion 21 in the prescribed direction and the end portion of the base plate 11 in the width direction.

The erected portion 20 includes a pair of pillars 20a extending from the base plate 11 at an interval in the prescribed direction of the overhanging portion 21 and connected to both ends of the overhanging portion 21 in the prescribed direction. The pair of pillars 20a substantially extend in the up-and-down direction. The pair of pillars 20a, the base plate 11, and the overhanging portion 21 define a first opening 23 penetrating therethrough in the width direction. In a portion of the base plate 11 between the pair of pillars 20a, a second opening 24 penetrating therethrough in the up-and-down direction is formed. The second opening 24 communicates with the first opening 23.

In each of the pair of overhanging pieces 13, the overhanging portion 21 includes a flat plate portion 21a having a lower surface opposed to and parallel with the upper surface of the end portion of the base plate 11 in the width direction, and a pair of protruding pieces 21b extending upward from both ends of the flat plate portion 21a in the prescribed direction. An outer end of the flat plate portion 21a in the width direction overhangs so as to reach a position that vertically matches an outer end of the base plate 11 in the width direction. In a front view, an upper edge of each protruding piece 21b has an arc shape, and is smoothly connected to an inside edge of each pillar 20a in the width direction. Recesses 21c are provided on inner surfaces of the pair of protruding pieces 21b opposed to each other.

Preferably, the connection body 22 extends substantially in the up-and-down direction, and is connected to the center of the overhanging portion 21 in the prescribed direction. Since the second opening 24 is provided, the connection body 22 is offset from the pillar 20a toward an outside in the width direction. An upper end of the connection body 22 extends from an inner end to an outer end of the flat plate portion 21a in the width direction, and a lower end of the connection body 22 extends from an edge defining the first opening 23 at the end portion of the base plate 11 in the width direction to an outer end of the base plate 11 in the width direction. In a front view, an outer side edge of the connection body 22 in the width direction is recessed in an arc shape, and an inner side edge of the connection body 22 in the width direction is formed like a straight line along the up-and-down direction.

Each of the pair of biasing portions 14 consists of a leaf spring supported by the base plate 11 in a cantilevered manner. The pair of biasing portions 14 are arranged inside the pair of locking pieces 12 in the width direction so as to bias the locked portion 6c upward. The pair of biasing portions 14 are arranged outside the pair of locking pieces 12 in the prescribed direction, but may be modified so as to be arranged inside the pair of locking pieces 12 in the prescribed direction. The pair of biasing portions 14 are preferably arranged at positions offset from each other in the width direction. Preferably, in portions of the base plate 11 arranged below the pair of biasing portions 14, third openings 25 penetrating therethrough in the up-and-down direction are formed so as to accommodate the biasing portions 14 during elastic deformation thereof. A distance in the up-and-down direction from the biasing portions 14 in a state of not being elastically deformed to the locking claws 18 is smaller than a height of the locked portion 6c in the up-and-down direction so that the pair of biasing portions 14 and the locking claws 18 can hold the locked portion 6c therebetween in the up-and-down direction. Further, the biasing portions 14 are elastically deformable such that the distance in the up-and-down direction from the biasing portions 14 to the locking claws 18 becomes greater than the height of the locked portion 6c in the up-and-down direction. Incidentally, each biasing portion 14 may be supported not by the base plate 11 but by the wall body 17, and may consist of a spring other than a leaf spring, for example, a compression coil spring.

The first opening 23 and the second opening 24 are provided, the lower surface of the overhanging portion 21 and the upper surface of the end portion of the base plate 11 in the width direction are parallel to each other, and the pair of biasing portions 14 are arranged at positions offset from each other in the width direction. Accordingly, the direction in which a mold for forming the clip 10 is removed can be secured, and the complexity of the mold can be suppressed. The shape that generates a step in the stepped portion 16 enhances the rigidity of the clip 10. Since the locked portion 6c has a relatively simple shape, the locked portion 6c can be extruded at low cost.

An attachment state of the clip 10 to the pad 5 will be described. The clip 10 is arranged at a prescribed position during molding of the pad 5 so as to be fixed to the pad 5. The pad 5 enters a space between the end portion of the base plate 11 in the width direction and the overhanging portion 21 of each overhanging piece 13, and thus the clip 10 is firmly supported by the pad 5. The connection body 22, which connects the overhanging portion 21 and the end portion of the base plate 11 in the width direction, reinforces the overhanging portion 21. Also, the connection body 22 is embedded in the pad 5, thereby stabilizing the position of the clip 10 with respect to the pad 5 and causing the pad 5 to firmly support the clip 10. Further, the pad 5 enters the through holes 15, the stepped portion 16, the recesses 21c, the first opening 23, and the second opening 24, thereby stabilizing the position of the clip 10 with respect to the pad 5 and causing the pad 5 to firmly support the clip 10.

Figure 7:
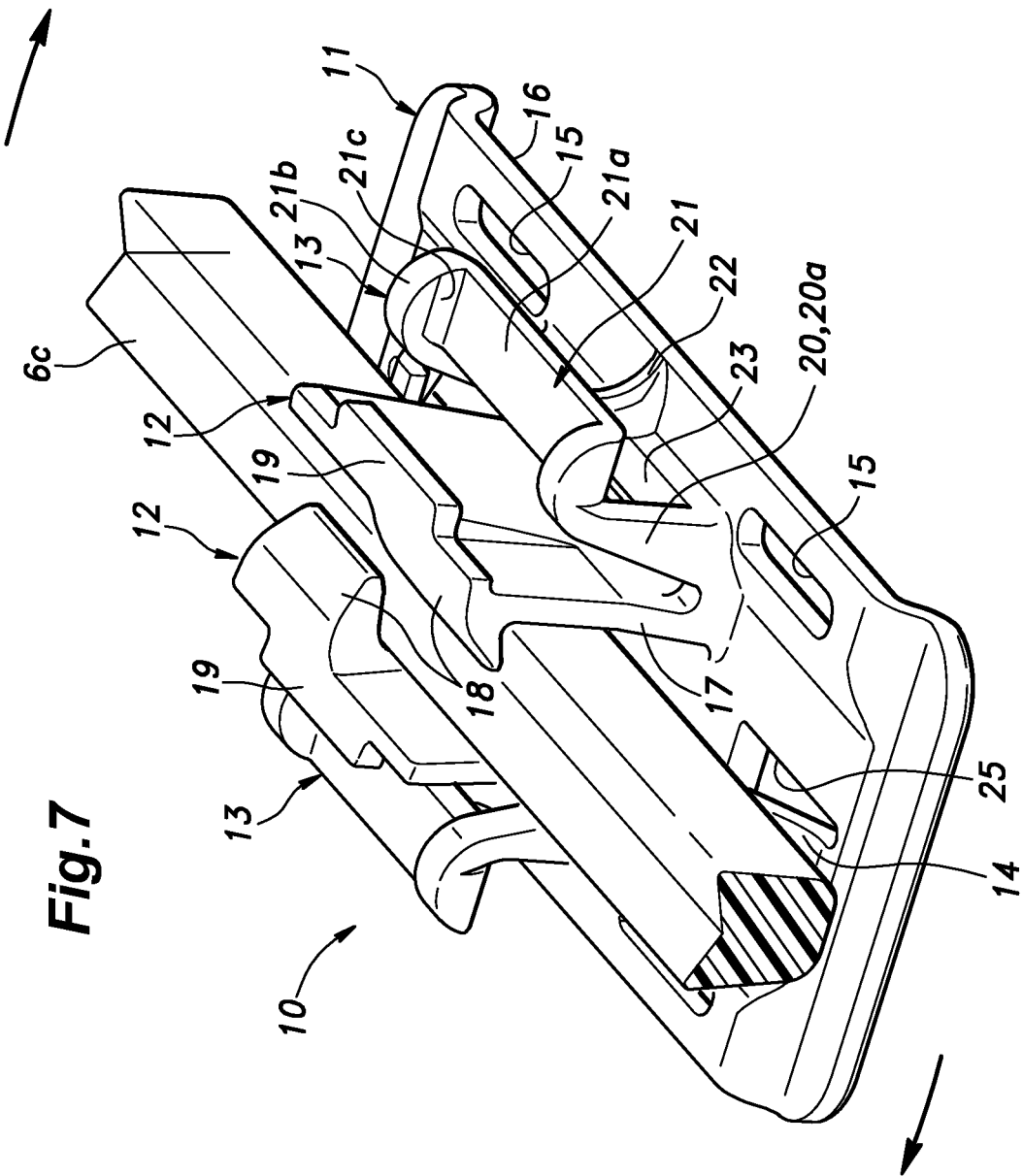
FIG. 7 is a perspective view showing a state where the skin locking clip according to the first embodiment locks a locked portion.

FIGS. 7 and 8 show the clip 10 and the locked portion 6c (the skin connecting portion 6b is not shown). An attachment/detachment of the locked portion 6c to/from the clip 10 will be described with reference to FIGS. 7 and 8.

The worker presses the locked portion 6c against upper surfaces of the pair of locking pieces 12 so as to attach the locked portion 6c to the clip 10. At this time, even if the locked portion 6c is pressed against the upper surfaces of the pair of locking pieces 12 in a state of being offset in the width direction, the guide portion 19 inclined downward toward an inside in the width direction guides the locked portion 6c toward the center in the width direction, namely, toward a space between the pair of locking pieces 12. The locked portion 6c slides on the inclined upper surfaces of the locking pieces 12, and thus the upper portions of the pair of locking pieces 12 are elastically deformed so as to be separated from each other in the width direction. When the distance in the width direction between the locking claw 18 of one of the locking pieces 12 and the wall body 17 of the other of the locking pieces 12 becomes equal to or greater than the width of the locked portion 6c, the locked portion 6c can move below the locking claws 18. When the locked portion 6c passes through the locking claws 18, the pair of locking pieces 12 returns to positions before the elastic deformation thereof.

Figure 8A:
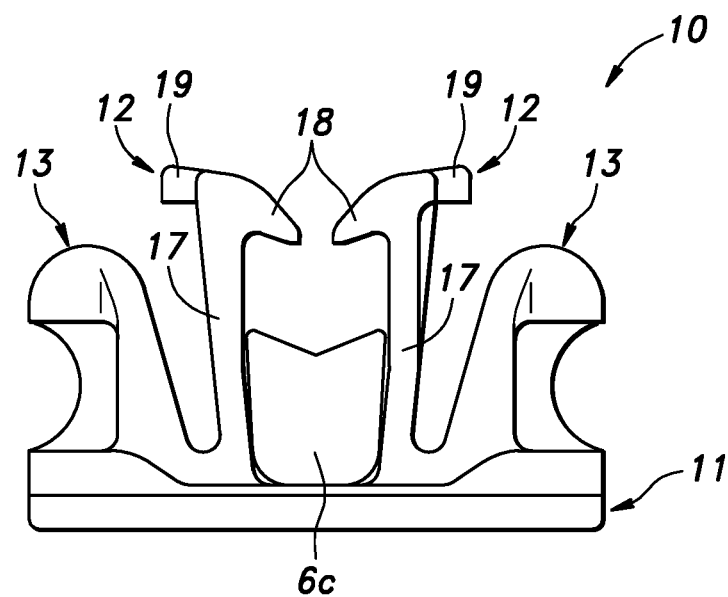
FIGS. 8A and 8B are front views each showing the skin locking clip and the locked portion according to the first embodiment (the locked portion is pushed in FIG. 8A, and the locked portion is locked in FIG. 8B)

By elastically deforming the pair of biasing portions 14, the worker can press the locked portion 6c below the locking claws 18 by a prescribed length (FIG. 8A). Accordingly, the worker can easily move the locked portion 6c below the locking claws 18 by pressing the locked portion 6c downward in this way, thereby easily attaching the locked portion 6c to the locking claws 18.

Figure 8B:
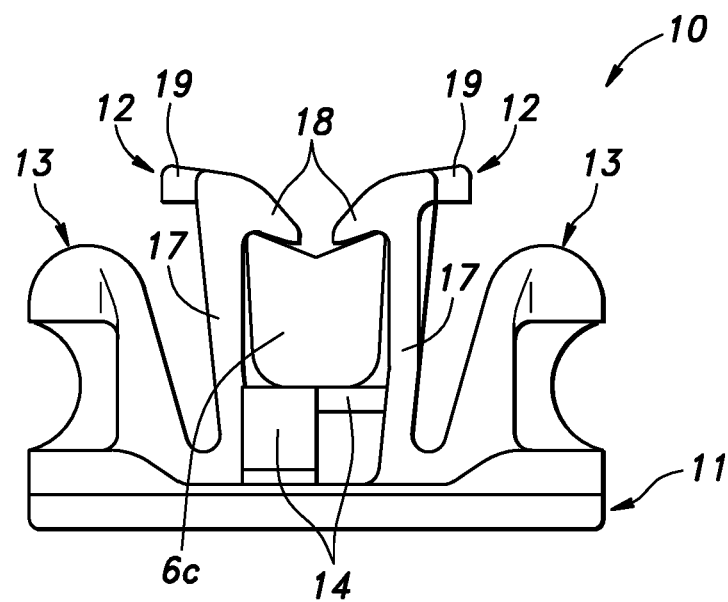

When the worker releases his/her hand from the locked portion 6c, the locked portion 6c, which is biased upward by the pair of biasing portions 14, is pressed against the pair of locking claws 18 (FIG. 8B). The locked portion 6c is supported by the clip 10 at four points, namely, by the pair of biasing portions 14 and the pair of locking claws 18. Accordingly, the movement of the locked portion 6c in the up-and-down direction is restricted, and the rotation of the locked portion 6c around an axis in the prescribed direction is prevented. In this way, the locked portion 6c is locked by the clip 10 without play, and thus unlikely to disengage from the clip 10.

When detaching the locked portion 6c from the clip 10, as shown by arrows in FIG. 7, the worker rotates the locked portion 6c around an up-and-down axis passing near the center of the locking pieces 12 in the prescribed direction so as to elastically deform the pair of locking pieces 12 such that the distance between the upper portions thereof is widened. When the distance between the locking claw 18 of one of the locking pieces 12 and the wall body 17 of the other of the locking pieces 12 becomes equal to or greater than the width of the locked portion 6c, the locked portion 6c can be detached from the clip 10. The pair of locking claws 18 are offset from each other in the prescribed direction, so that a gap for the detachment of the locked portion 6c can be relatively easily generated between the upper portions of the pair of locking pieces 12. Further, since the end portion of each of the pair of locking claws 18 on the center side in the prescribed direction is inclined in a plan view, the shortest distance between the pair of locking claws 18 increases, so that the locked portion 6c can be easily detached.

Figure 9:
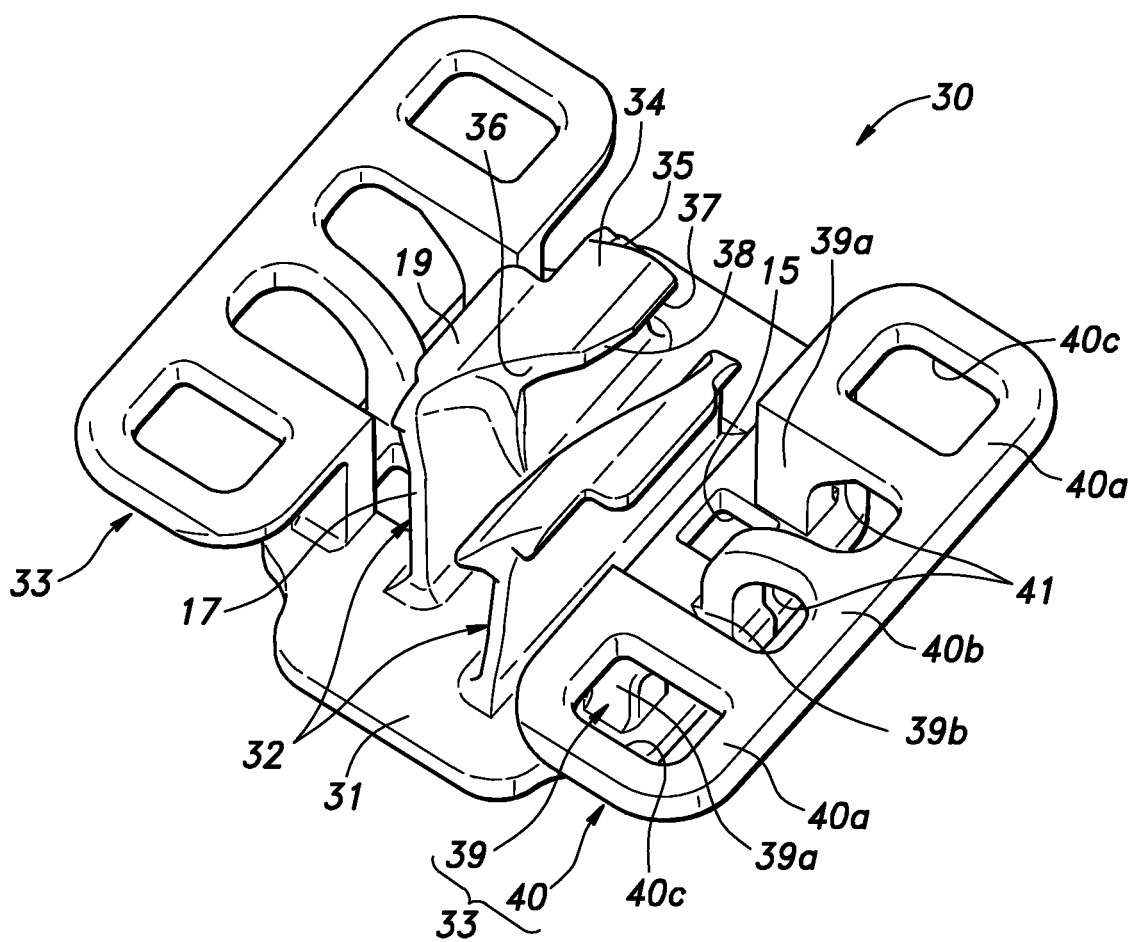
FIG. 9 is a perspective view of a skin locking clip according to a second embodiment.
Figure 10:
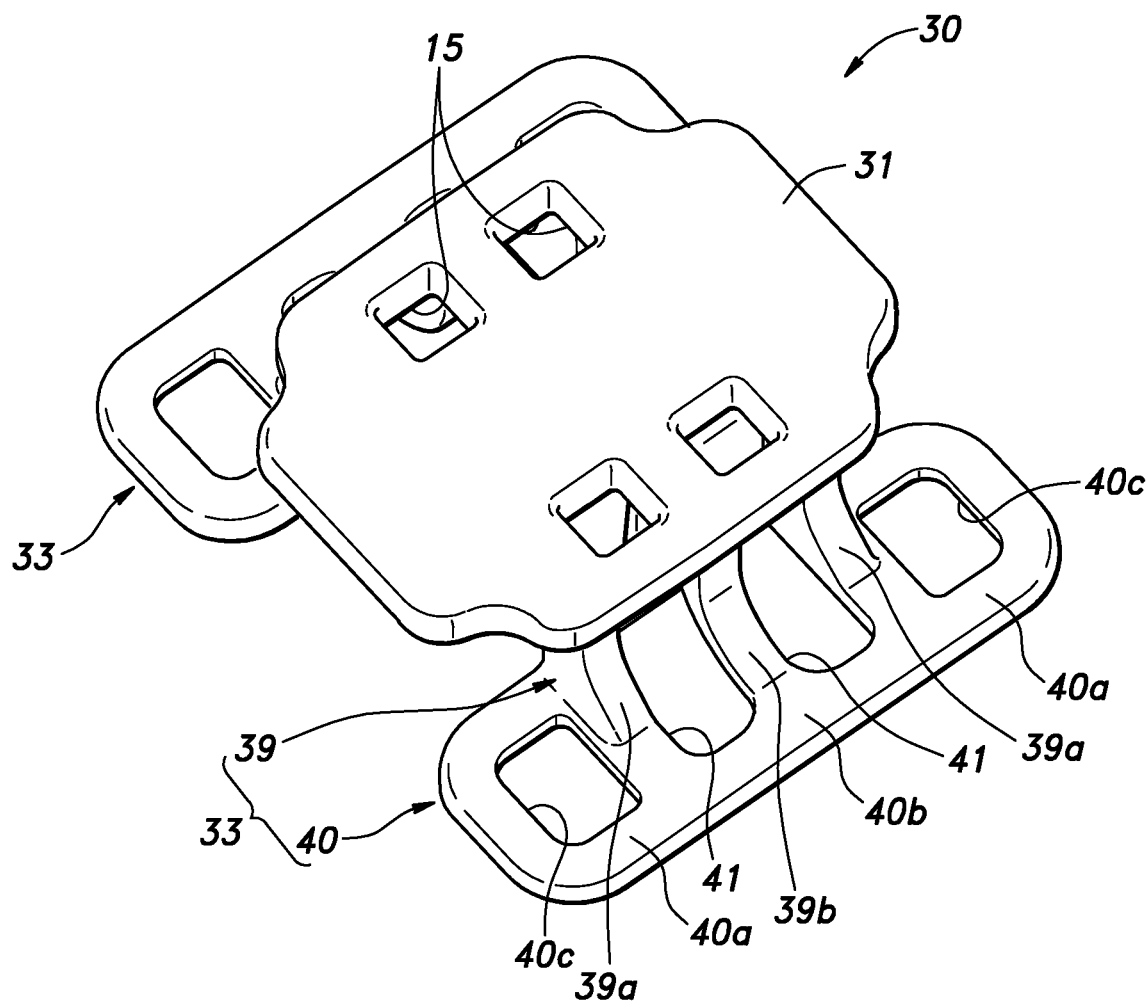
FIG. 10 is a perspective view of the skin locking clip according to the second embodiment.

With reference to FIGS. 9 and 10, a skin locking clip 30 according to the second embodiment (hereinafter referred to as "the clip 30") will be described. In the following description, the configurations common with the first embodiment will be denoted by the same reference numerals and the description thereof will be omitted.

The clip 30 includes a base plate 31 embedded in the pad 5 (see FIG. 2) at both ends in the width direction thereof, a pair of locking pieces 32 erected on an upper surface of the base plate 31 and configured to lock the locked portion 6c (see FIG. 2), and a pair of overhanging pieces 33 erected on the upper surface of the base plate 31 outside the pair of locking pieces 32 in the width direction. The clip 30 has a symmetric shape (double symmetric shape), and the shape of the clip 30 before rotation coincides with the shape of the clip 30 after rotation when the clip 30 rotates 180°(360°/2) around an up-and-down axis passing through the center in the extending direction thereof and the center in the width direction thereof. Preferably, the clip 30 is an injection-molded product made of resin.

The base plate 31 is a plate-shaped portion, and the longitudinal direction and the width direction thereof coincide with the extending direction and the width direction of the groove 8 (see FIG. 2), respectively. In the following, unless otherwise noted, "the prescribed direction" refers to the direction that coincides with the extending direction of the groove 8 and the longitudinal direction of the base plate 31, and "the width direction" refers to the direction that coincides with the width directions of the groove 8 and the base plate 31. In the vicinity of the parts of the base plate 31 where the overhanging pieces 33 are erected, a plurality of through holes 15 penetrating therethrough in the up-and-down direction are provided.

The pair of locking pieces 32 are configured so as to be arranged in the groove 8 (see FIG. 2). Each of the pair of locking pieces 32 includes a wall body 17 erected on the base plate 31, a locking claw 34 extending from a tip portion of the wall body 17 toward an inside in the width direction so as to lock the locked portion 6c (see FIG. 2), and a guide portion 19 extending from the tip portion of the wall body 17 toward an outside in the width direction. The guide portion 19 is positioned higher than the upper end of the overhanging piece 33 so as not to contact the overhanging piece 33 when the wall body 17 flexes outward in the width direction.

The locking claw 34 is configured similarly to the locking piece 12 (see FIG. 3, etc.) of the first embodiment except for the shape defining side edges and an end edge. As viewed from above, the locking claw 34 has a first side edge 35 extending from one end portion of the wall body 17 in the prescribed direction toward an inside in the width direction to be parallel to the width direction, a second side edge 36 extending from the other end portion of the wall body 17 in the prescribed direction in a manner inclined toward the first side edge 35 with respect to the inside in the width direction, an extension end edge 37 extending from an extension end of the first side edge 35 toward the other in the prescribed direction in parallel in the prescribed direction, and a beveled corner edge 38 connecting the second side edge 36 and the extension end edge 37 and having an angle relative to the prescribed direction smaller than the angle of the second side edge 36 relative to the prescribed direction. As viewed from above, the beveled corner edge 38 forms a line that cuts the corner that would be formed by intersection of the extension line of the second side edge 36 and the extension line of the extension end edge 37. Instead of extending linearly, the beveled corner edge 38 may extend in a curved manner as viewed from above. The second side edges 36 of the pair of locking claws 34 oppose each other and are parallel to each other, and the beveled corner edges 38 of the pair of locking claws 34 also are parallel to each other.

The pair of overhanging pieces 33 are arranged so as to be embedded in the pad 5. The pair of overhanging pieces 33 are mirror images of each other and symmetrical with respect to a plane passing through the center of the clip 30 in the width direction and arranged perpendicularly to the width direction. Each of the pair of overhanging pieces 33 includes an erected portion 39 erected on the upper surface of a widthwise end portion of the base plate 31 and an overhanging portion 40 connected to a tip side of the erected portion 39 and extending in parallel with the base plate 11.

The erected portion 39 included a pair of pillars 39a spaced from each other in the prescribed direction and extending upward from the base plate 31 and a connection body 39b extending above from a part of the base plate 31 between the pair of pillars 39a so as to be curved outward in the width direction and connected to the overhanging portion 40. The overhanging portion 40 includes a pair of first overhanging portions 40a each extending from an extension end of the corresponding pillar 39a outward both in the width direction and the prescribed direction and a second overhanging portion 40b extending from the upper end of the connection body 39b outward in the width direction and then extending in both directions along the prescribed direction to be connected to the first overhanging portions 40a. Each first overhanging portion 40a is provided with a through hole 40c penetrating therethrough in the up-and-down direction. In the width direction, the outer end of the overhanging portion 40 is positioned more outside than the edge of the base plate 31. In the prescribed direction, the both end portions of the overhanging portion 40 are positioned more outside than the both edges of the base plate 31. On each side of the clip 30 in the width direction, the end portion of the base plate 31 in the width direction, the pillars 39a, the connection body 39b, and the second overhanging portion 40b define two openings 41.

The clip 30 is arranged at a prescribed position during molding of the pad 5 (see FIG. 2) so as to be fixed to the pad 5. Since the overhanging portion 40 extends more outward than the base plate 31 as viewed from above, the overhanging portion 40 is firmly supported by the pad 5. Accordingly, even though the base plate 31 is relatively small, the resistive force against the pull-out force applied to the clip 30 from the skin material 6 (see FIG. 2) becomes large. Further, since the pad 5 enters the through holes 15 of the base plate 31, the through holes 40c of the overhanging portion 40, and the openings 41, the clip 30 is firmly supported by the pad 5 and the position of the clip 30 with respect to the pad 5 is stabilized.

Similarly to the clip 10 of the first embodiment, the locked portion 6c (see FIG. 2) of the skin material 6 is attached to the clip 30. Since each locking piece 32 is provided with the beveled corner edge 38, it is easy to put the locked portion 6c between the pair of locking claws 34.

After molding the pad 5 (see FIG. 2), roller crashing is performed, in which a roller (not shown in the drawings) is rotated while being pressed against the pad 5 to adjust the size of the bubbles in the pad 5, which is a foam body. At this time, the guide portion 19 which receives a load from the roller flexes outward in the width direction, but since the guide portion 19 is positioned higher than the upper end of the overhanging piece 33, the guide portion 19 does not come into contact with the overhanging piece 33.

Figure 11:
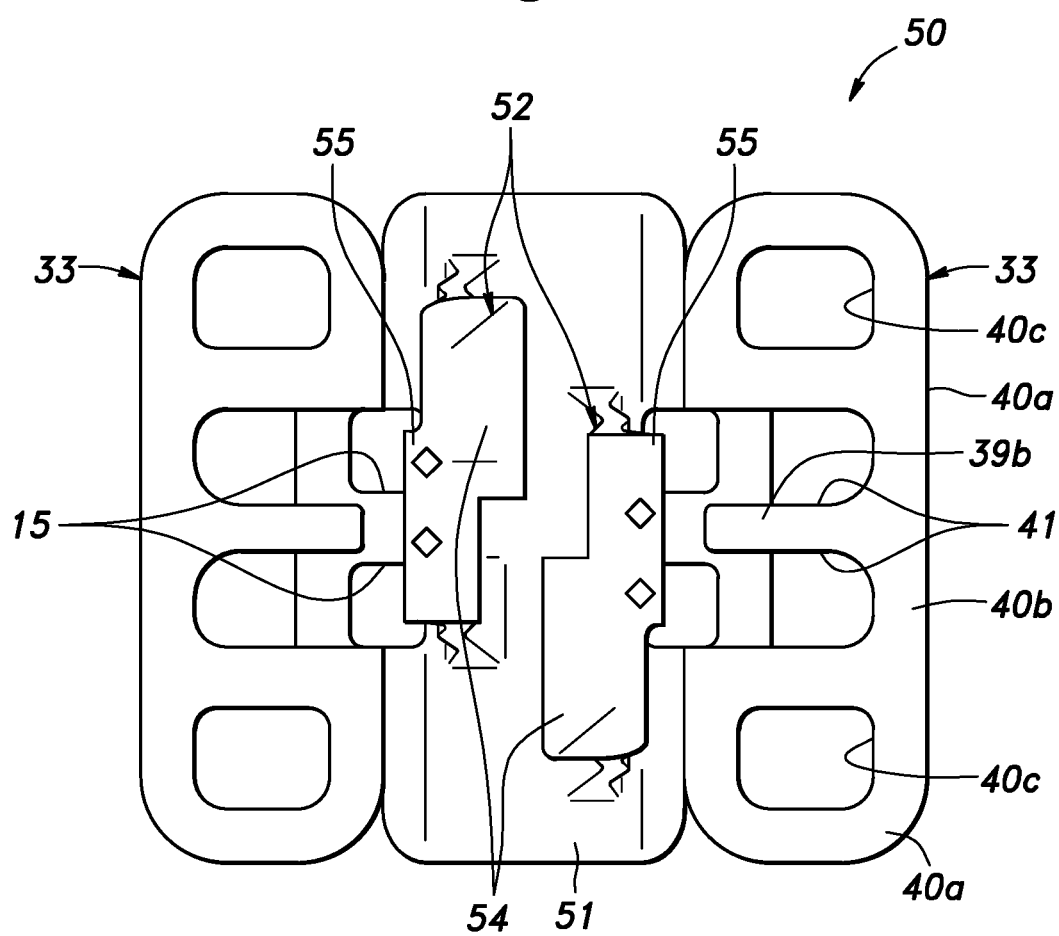
FIG. 11 is a plan view of a skin locking clip according to a modification of the second embodiment.
Figure 12:
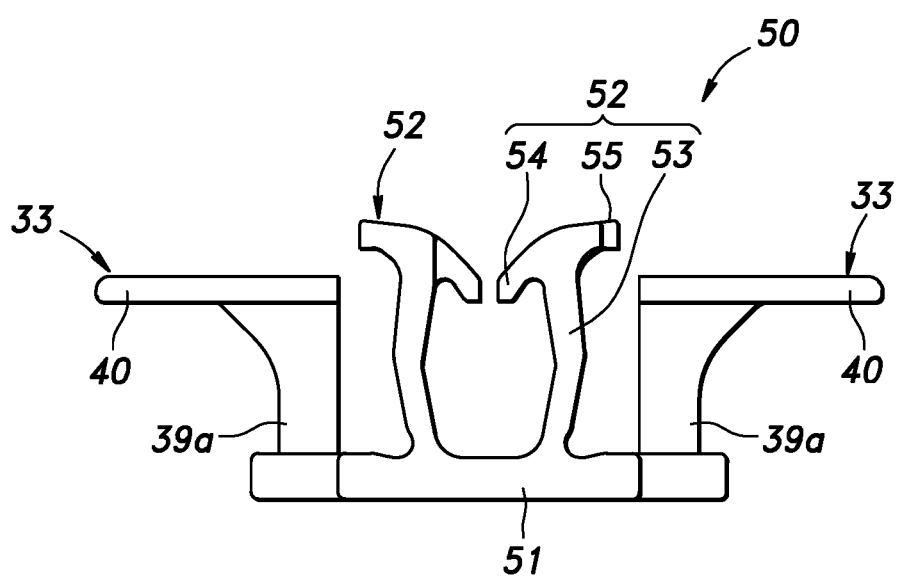
FIG. 12 is a front view of the skin locking clip according to the modification of the second embodiment.

With reference to FIGS. 11 and 12, a skin locking clip 30 according to a modification of the second embodiment (hereinafter referred to as "the clip 50") will be described. In the following description, the configurations common with the above embodiment will be denoted by the same reference numerals and the description thereof will be omitted.

The clip 50 includes a base plate 51 embedded in the pad 5 (see FIG. 2) at both ends in the width direction thereof, a pair of locking pieces 52 erected on an upper surface of the base plate 51 and configured to lock the locked portion 6c (see FIG. 2), and a pair of overhanging pieces 33 erected on the upper surface of the base plate 51 outside the pair of locking pieces 52 in the width direction. The clip 50 has a symmetric shape (double symmetric shape), and the shape of the clip 50 before rotation coincides with the shape of the clip 50 after rotation when the clip 50 rotates 180°(360°/2) around an up-and-down axis passing through the center in the extending direction thereof and the center in the width direction. Preferably, the clip 50 is an injection-molded product made of resin.

In contrast to the base plate 31 shown in FIGS. 9 and 10, which is shorter than the overhanging piece 33 in the length in the prescribed direction (longitudinal direction), the base plate 51 shown in FIGS. 11 and 12 is substantially the same as the overhanging piece 33 in the length in the longitudinal direction. The both ends of the base plate 51 in the prescribed direction and the both ends of the overhanging piece 33 in the prescribed direction are arranged at positions aligned in the width direction. Thereby, the pad 5 can support the base plate 51 more firmly than in the main example of the second embodiment.

The pair of locking pieces 52 are configured so as to be arranged in the groove 8 (see FIG. 2). Each of the pair of locking pieces 52 includes a wall body 53 erected on the base plate 51, a locking claw 54 extending from a tip portion of the wall body 53 toward an inside in the width direction so as to lock the locked portion 6c (see FIG. 2), and an extension part 55 that extends outward in the width direction from the tip portion of the wall body 17 and is positioned higher than the upper end of the overhanging portion 40.

When viewed in the prescribed direction, the wall body 53 has a shape in which the intermediate portion in the up-and-down direction is bent or curved outward in the width direction. When an upward force is applied to the locked portion 6c (see FIG. 2) via the skin connecting portion 6b (see FIG. 2), a force pulling the wall body 53 upward is applied to the wall body 53 via the locking claw 54. At this time, the wall body 53 elastic deforms such that the bent or curved shape approaches a linear shape, thereby to absorb the impact of the force.

Also, when viewed in the prescribed direction, the thickness of each wall body 53 is greater in the upper portion than in the lower portion. The greater thickness of the upper portion of the wall body 53 ensures strength. The smaller thickness of the lower portion of the wall body 53 provides more flexibility so that, when the locked portion 6c is inserted from above, the lower portion of each wall body 53 more easily flexes outward in the width direction to widen the space between the pair of locking claws 54, whereby the load when inserting the locked portion 6c between the locking claws 54 can be reduced.

In addition, the shape of the upper portion of the wall body 53 as viewed from above differs from the shape in the first embodiment and the main example of the second embodiment. In the first embodiment (see FIG. 3) and the main example of the second embodiment (see FIG. 9), the upper portion of the wall body 17 as viewed from above swells toward an inside in the width direction on the side in the prescribed direction provided with the locking claw 18, 34 and is bent relative to the prescribed direction so as to swell toward an outside in the width direction on the opposite side in the prescribed direction. In contrast, in the modification of the second embodiment, the upper portion of the wall body 53 has no part swelling in the width direction, and extends substantially linearly in the prescribed direction. Thereby, when a force is applied to the wall body 53, concentration of stress on a specific part can be avoided.

The locking claw 54 differs from the locking claw 34 of the main example of the second embodiment (see FIG. 9) in that the locking claw 54 has a substantially rectangular outline as viewed from above, the length of the locking claw 54 in the prescribed direction is relatively long, and the lower surface of the tip end portion of the locking claw 54 is substantially parallel with the surface of the base plate 51. Due to the features that the side edge on the center side in the prescribed direction is not inclined, that the side edge on the end side in the prescribed direction extends outward in the prescribed direction more than the central part of the through hole 40c of the overhanging portion 40, and that the lower surface of the tip end portion of the locking claw 54 is substantially parallel with the surface of the base plate 51, the degree of engagement of the locking claw 54 with the locked portion 6c is increased.

The extension part 55 differs from the guide portion 19 of the first embodiment (see FIG. 3) and the main example of the second embodiment (see FIG. 9) in that the extension part 55 is disposed on the side opposite from the side on which the locking claw 54 is provided with respect to the longitudinal direction and that the inclination angle relative to the width direction is relatively small. When viewed in the prescribed direction, the extension part 55 is inclined upward toward the outside in the width direction, but the inclination angle is smaller than the inclination angle of the guide portion 19, and the extension part 55 may be substantially parallel to the width direction. Also, the extension part 55 extends substantially in parallel with the prescribed direction. As a result of this, the upper surface of the extension part 55 consists of a plane substantially parallel with or slightly inclined relative to a plane containing the width direction and the prescribed direction. The upper surface of the extension part 55 is a part pushed by an ejector pin for demolding when injection-molding the clip 50. Since the tip of the ejector pin contacts the upper surface the extension part 55 that is a plane having substantially no inclination, the tip of the ejector pin may have a simple shape. Because the extension part 55 is positioned higher than the upper end of the overhanging portion 40, similarly to the guide portion 19 of the main example of the second embodiment, the extension part 55 does not come into contact with the overhanging portion 40 at the time of roller crashing.

The present invention has been described in terms of specific embodiments, but is not limited by such embodiments, and can be modified in various ways. The present invention can be applied not only to the vehicle seat but also to a seat for a transportation means other than a vehicle or another article provided with a pad and a skin material and having a tuck-in portion. The stepped portion may be modified so as to be recessed downward. The overhanging pieces of the first embodiment may be modified such that the wall body of each locking piece functions as the erected portion, and the overhanging portion extends from the wall body of the locking piece toward the outside in the width direction. The biasing portion and/or stepped portion of the first embodiment may be provided in the clip of the second embodiment. The shape of the locking piece of the second embodiment may be applied to the clip of the first embodiment. The entire contents of the basic application of the present application for which the priority is claimed under the Paris Convention and the entire contents of the prior art cited in this application are incorporated herein by reference.

LIST OF REFERENCE NUMERALS

| | |
|---|---|
| 5: | pad |
| 6: | skin material |
| 6c: | locked portion |
| 8: | groove |
| 10, 30, 50: | skin locking clip |
| 11, 31, 51: | base plate |
| 12, 32, 52: | locking piece |
| 13, 33: | overhanging piece |
| 14: | biasing portion |
| 16: | stepped portion |
| 17, 53: | wall body |
| 18, 34, 54: | locking claw |
| 19: | guide portion |
| 20, 39: | erected portion |
| 20a, 39a: | pillar |
| 21, 40: | overhanging portion |
| 21a: | flat plate portion |
| 22, 39b: | connection body |
| 23: | first opening (opening) |
| 35: | first side edge |
| 36: | second side edge |
| 37: | extension end edge |
| 38: | beveled corner edge |
| 41: | opening |

The invention claimed is:

1. A skin locking clip embedded in a groove of a pad for fixing a locked portion of a skin material that covers at least a portion of the pad, the groove extending in a prescribed direction with a prescribed width and depth, the skin locking clip comprising:
a base plate extending along the prescribed direction and a width direction of the groove and embedded in the pad at least at an end in the width direction;
a pair of locking pieces erected on the base plate so as to be opposed to each other in the width direction for locking the locked portion and each including a locking claw on a side where the locking pieces are opposed to each other; and
an overhanging piece including an overhanging portion opposed to the base plate on an outside of at least one of the locking pieces in the width direction or extending more outward than an edge of the base plate in the width direction,
wherein the overhanging piece includes an erected portion erected on the base plate, and the overhanging portion extends outward in the width direction of the base plate from a tip side of the erected portion,
wherein the erected portion includes at least one pair of pillars extending from the base plate at an interval in the prescribed direction, and an opening is formed between the pillars,
wherein the overhanging piece further includes a connection body connecting an intermediate portion of the overhanging portion in the prescribed direction and the base plate.

2. The skin locking clip according to claim 1, wherein the overhanging portion opposes the base plate and has an opposed surface parallel to an opposed surface provided at an end of the base plate in the width direction.

3. The skin locking clip according to claim 1, wherein a stepped portion is provided at the end of the base plate in the width direction, the stepped portion being offset from a portion adjacent thereto in a depth direction of the groove.

4. A skin locking clip embedded in a groove of a pad for fixing a locked portion of a skin material that covers at least a portion of the pad, the groove extending in a prescribed direction with a prescribed width and depth, the skin locking clip comprising:
a base plate extending along the prescribed direction and a width direction of the groove and embedded in the pad at least at an end in the width direction;
a pair of locking pieces erected on the base plate so as to be opposed to each other in the width direction for locking the locked portion and each including a locking claw on a side where the locking pieces are opposed to each other; and
an overhanging piece including an overhanging portion opposed to the base plate on an outside of at least one of the locking pieces in the width direction or extending more outward than an edge of the base plate in the width direction, wherein each locking piece further includes a wall body erected on the base plate and having a tip portion from which a locking claw extends, the locking claw includes, as viewed in a direction perpendicular to the base plate, a first side edge extending from the wall body toward an inside in the width direction, a second side edge extending from the wall body in a manner inclined toward the first side edge with respect to the inside in the width direction, an extension end edge extending from an extension end of the first side edge substantially in parallel with the prescribed direction, and a beveled corner edge connected to the second side edge and the extension end edge and having an angle relative to the prescribed direction smaller than that of the second side edge, and the second side edges of the pair of locking claws oppose each other.

* * * * *